Figure 1:
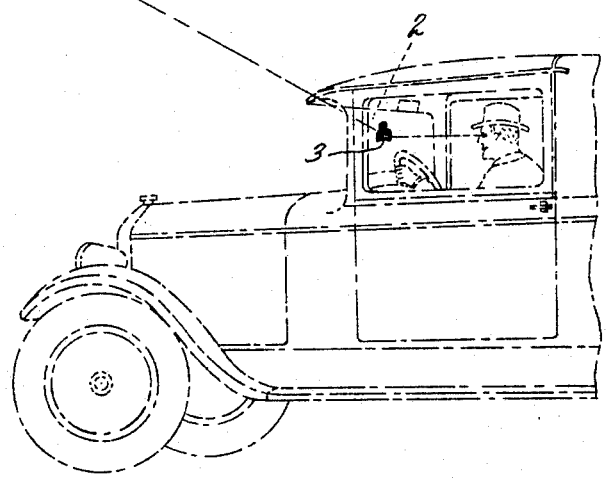

March 21, 1933.  B. W. DAVID  1,902,322

SIGNAL VIEWING ATTACHMENT FOR AUTOMOBILES

Filed Oct. 20, 1928

INVENTOR
BRUCE W. DAVID
BY Milburn and Milburn
ATTORNEYS.

Patented Mar. 21, 1933

1,902,322

UNITED STATES PATENT OFFICE

BRUCE W. DAVID, OF CLEVELAND HEIGHTS, OHIO, ASSIGNOR TO THE MOONBEAM MANUFACTURING COMPANY, A CORPORATION OF OHIO

SIGNAL VIEWING ATTACHMENT FOR AUTOMOBILES

Application filed October 20, 1928. Serial No. 313,878.

This invention relates to signal viewing attachments for automobiles and is an improvement upon my Patent No. 1,637,309 of July 26, 1927.

As will be seen from the patent just referred to, this type of device comprises a plano-concavo lens which is attached upon the inside of the windshield of an automobile and with the thick part of the lens at the top so as to facilitate the viewing of overhead traffic signals without requiring the driver to assume an awkward or uncomfortable position.

When the lens is secured to the windshield by means of cement, as provided for in the patent above referred to, there has been experienced considerable difficulty because of the breaking of the windshield at the point of attachment of the lens. Since such attachment of the lens amounts to a virtual increase in thickness of the glass of the windshield at this point, it is believed by some that the breakage is due to the resultant interference with the normal flexure of the glass. According to the theory of others, the glass is broken as a result of the expansion and contraction of the windshield due to sudden changes in temperature, the virtual increase in the thickness of the glass at the point of the lens preventing the normally uniform degree of expansion and contraction throughout the entire area of the windshield.

Whatever may be the correct theory or reason for the breaking of the windshield to which such a lens has been applied by means of cement, the present invention is calculated to obviate this difficulty. Accordingly, the object of the present invention is to devise a means for attaching a signal-viewing lens to the window or the windshield of an automobile in such a manner that there will be no danger of the windshield becoming broken because of the presence of the lens.

Having in mind the theories just referred to, it is the object of the present invention to devise such an attachment which will not interfere with the normal flexure of the windshield or with the normal expansion and contraction thereof.

Another object consists in providing such an attachment which may be readily secured to or removed from the windshield and which will, at the same time, prevent accidental dislodgment of the lens from the attaching means.

More specifically, it is the object of the present invention to devise such an attaching means to be applied at the top of the lens and out of the field of vision so as not to interfere with the viewing of the signals through the lens and at the same time will leave the lens surface which is adjacent the windshield or other window of the automobile, altogether free.

Other objects will appear from the following description and claims when considered together with the accompanying drawing.

Figure 2:
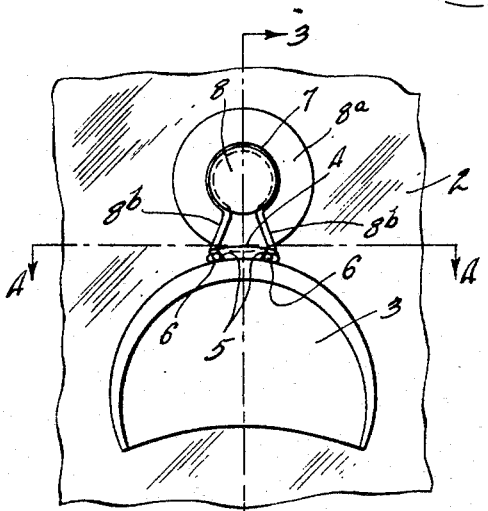
Figure 3:
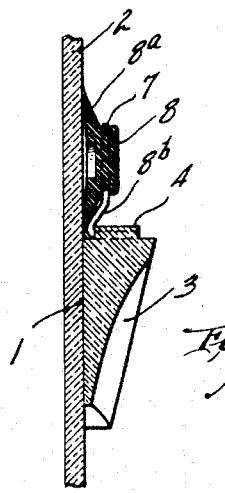
Figure 4:
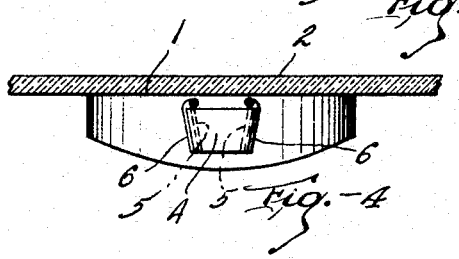

Fig. 1 illustrates the general assembly and use of the present device; Fig. 2 shows the present device in elevation as viewed from the position of the driver of the automobile; Fig. 3 is a sectional view taken on line 3—3 of Fig. 2; and Fig. 4 is a sectional view taken on line 4—4 of Fig. 2.

According to the present invention, the lens is preferably attached to the inside of the windshield although it may be attached to the outside, if so desired. This lens is placed in such position upon the windshield that it will receive and deflect the rays of light from overhead traffic signals so as to be easily viewed by the driver of the automobile during normal posture. As will be understood, the rays of light would otherwise be obscured by the front part of the roof of the car and the driver would be required to assume an awkward and uncomfortable position in order to obtain a view of the signals.

The lens in the present case has a prismatic action and has its thick portion arranged at the top. The particular lens here disclosed has a plain surface 1 arranged adjacent the inner surface of the windshield 2 and has a spherical surface 3 so as to not only deflect the rays of light with a prismatic action but also to cover a comparatively wide field of view.

Upon the top edge of the lens and at substantially the middle point thereof, there is provided a substantially keystone-shaped integral projection 4 which has its side edges under-cut, as indicated at 5. These under-cut side edges are adapted to receive with spring or snap engagement the end portions 6 of a spring wire member which has its middle portion bent in the form of a circular loop 7. The loop 7 affords support for the rubber suction cup which is held therein by its own resilience. Loop 7 engages within the groove at the base of the button 8 of the rubber cup. A convenient manner of assembling the suction cup and wire member is to thread the bead at the edge of the button 8, through the gap in the loop 7 by a turning of the cup with respect to the wire member until the button has been completely engaged in the loop. The conical marginal or flange portion of the rubber cup, as indicated by reference numeral 8ª, is adapted to engage the surface of the windshield in a manner which is obvious to those who are familiar with the use of suction cups. The intermediate side portions 8ᵇ of the spring wire diverge outwardly from the ring portion 7 and extend across the corner portions of the one end of the keystone projection 4, as indicated in Figs. 2 and 4. This is for the purpose of ensuring the lens against accidental dislodgment in the one direction, while the particular keystone shape of the projection 4 prevents accidental dislodgment in the other direction. The end portions 6 of the resilient wire member are given a form corresponding to the direction of the sides of the keystone projection 4.

These parts are so constructed and arranged that the suction cup occupies a position above the lens and entirely out of the field of vision through the lens. The ring 7 therefore lies in a plane at substantially right angles to the generally horizontal plane of the end portions 6. The intermediate side portions 8ᵇ are inclined in a direction substantially along the inclined surface of the flexible portion 8ª of the suction cup so that the engaging surface of the rubber cup will lie in substantially the same plane as the plain surface 1 of the lens. As a result, when the rubber cup is applied to the surface of the windshield, the plain surface 1 of the lens will lie substantially against the inner surface of the windshield and will be securely held in such position by the secure engagement of the suction cup with the glass of the windshield.

In applying the present device to the windshield, it is merely necessary to moisten the inner surface of the rubber cup and to then press the same against the glass with sufficient force to cause adherence of the rubber to the glass upon release of the pressure. Because of the very nature of the rubber suction cup and also because of the limited extent of engagement of the attaching means with the windshield, this form of attachment does not interfere at all with the normal flexure of the windshield; neither does it interfere with the normal expansion and contraction of the windshield due to changes in temperature. Furthermore, the end portions 6 of the spring wire member are of sufficient extent to engage the keystone projection in such a manner that there is prevented any turning of the lens member about a vertical axis. As before explained, accidental dislodgment of the lens in a direction either forwardly or rearwardly is prevented by means of the particular manner of engagement of the intermediate side portions of the spring member with the corner portions of the keystone projection as well as by the particular form of the projection 4 itself. Thus I have devised an effective connection between the glass of the lens and the metallic bracket. Furthermore, the attachment may be easily applied to the windshield and may be removed at any time desired. The form of attachment is comparatively inexpensive and does not cause any obstruction to the vision of the driver. Moreover, the lens may be turned to position above the rubber cup, if at any time desired, by merely turning the ring portion 7 about the button 8 and without disturbing the secure engagement of the rubber cup upon the windshield.

Thus, the present form of attachment provides a means of preventing breaking of the windshield, heretofore experienced, and thereby permits the continued use of the signal viewing lens without objection and with all of its well-known advantages.

It is to be understood that, although the present invention is particularly adapted for use in connection with the signal-viewing lens, as hereinbefore referred to and explained, yet the same form of attachment for mounting a lens upon a rubber suction cup, is capable of more general use and may be employed in other associations. Any and all uses are intended to be comprehended by the following claims, as also are any and all modifications which might be made in the present specific disclosure without departing from the spirit of the present invention.

What I claim is:

1. In a device of the class described, the combination of a lens, and means for supporting the same in proximity to a glass window, said means including a projection of restricted peripheral extent integral with the lens, and said means being out of the field of vision through the lens and having an effective surface area of restricted extent as compared with the adjacent surface area of the lens.

2. In a device of the class described, the combination of an automobile window, a lens for viewing overhead traffic signals, and means provided directly upon a marginal portion of the lens, and out of the field of vision through the lens, and extending over only a comparatively small annular extent thereof, for supporting the same in proximity to the window.

3. In a device of the class described, the combination of an automobile window, a lens for viewing overhead traffic signals, and means, including a suction element, provided directly upon an upper restricted marginal portion of said lens and out of the field of vision through the lens, for attaching the same to the window.

4. In a device of the class described, the combination of an automobile window, a lens having a thicker portion at the top for facilitating the viewing of overhead traffic signals, and means provided directly upon a restricted marginal portion of the top edge of the lens and out of the field of view through the lens, for supporting the same in proximity to the window.

5. In a device of the class described, the combination of a lens having a marginal annularly restricted projection integral therewith, and means, including a suction element, for engaging said projection as a means of attaching the lens to a window.

6. In a device of the class described, the combination of a lens having a marginal annularly restricted projection integral therewith, and means for engaging said projection as a means of supporting the lens in proximity to a window.

7. In a device of the class described, the combination of a bracket adapted to directly and removably engage an annularly restricted portion of a lens to support the same, means for readily disconnectible attachment of the bracket in proximity to a glass window, and means for preventing accidental removal of the lens from the bracket.

8. In a device of the class described, the combination of a bracket adapted to removably engage an annularly restricted portion of a lens to support the same, means for readily disconnectible attachment of the bracket in proximity to a glass window, and interengaging means upon the bracket and lens for preventing accidental displacement of the lens either forwardly or rearwardly in the bracket.

9. In a device of the class described, the combination of a resilient bracket, means of supporting the bracket in proximity to a window, a lens supported by the bracket, and means provided upon an annularly restricted portion of the lens co-operating with the resiliency of the bracket for holding the lens positively in set position in the bracket.

10. In a device of the class described, the combination of a resilient bracket, a suction means carried by said bracket for attachment to a glass window, and a lens mounted in said bracket and having means provided upon an annularly restricted portion of the lens for co-operating with said bracket for holding the lens in assembly.

11. In a device of the class described, the combination of a resilient bracket, a suction means carried by said bracket for attachment to a glass window, and a lens having an annularly restricted integral projection engaged by said resilient bracket so as to thereby hold the lens in assembly therewith.

12. In a device of the class described, the combination of a resilient wire bracket having an intermediate loop portion and free end portions, a suction cup held in said loop and adapted for attachment to a window or the like, and a lens having an integral substantially key-stone-shaped projection engaged between the correspondingly formed end portions of the wire bracket, thereby serving to secure the lens against accidental dislodgment.

13. In a device of the class described, the combination of a lens, means engaging an annularly restricted portion of the lens for attaching the same to a glass window, and means forming part of said attaching means for insuring against interference with normal flexure of said window.

14. In a device of the class described, the combination of a lens, means engaging an annularly restricted portion of the lens for attaching the same to a glass window, and means forming part of said attaching means for ensuring against interference with normal expansion and contraction of said window.

15. In a device of the class described, the combination of a resilient wire bracket having an intermediate loop portion and free end portions, a suction cup held in said loop and adapted for attachment to a window or the like, and a lens having a thicker portion at the top and having an integrally formed substantially key-stone-shaped projection on the upper part of the lens, said projection being engaged between the correspondingly formed end portions of the wire bracket, thereby serving to prevent dislodgment of the lens from the bracket.

16. In a device of the class described, the combination of a resilient wire bracket having an intermediate loop portion and free end portions, a suction cup held in said loop and adapted for attachment to a window or the like, and a lens having a thicker portion at the top and having an integrally formed substantially key-stone-shaped projection on the upper part of said lens, said projection being engaged between the correspondingly formed end portion of the wire bracket, and the side portions of the wire between the loop and the ends thereof, extending across the larger end portion of the key-stone projection, thereby serving to prevent accidental dislodgment of the lens from the bracket.

17. In a device of the class described, the combination of a resilient wire bracket having an intermediate loop portion and free end portions, a suction cup held in said loop and adapted for attachment to a window or the like, and a lens having a thicker portion at the top and having an integrally formed substantially key-stone-shaped projection on the top of said lens, the converging sides of said projection being under-cut, the end portions of the wire bracket being shaped so as to have spring engagement with said under-cut sides, the side portions of the wire between the loop and the end portions thereof, extending across the corners of the larger end of the key-stone projection, said parts being so constructed and arranged that the lens is adapted to be positioned in close proximity to the window, and the lens surface adjacent to the window being entirely free of attaching means.

18. In a device of the class described, the combination of an automobile glass window, a lens having a thicker part at the top and so positioned as to aid the operator in viewing overhead traffic signals which would otherwise be obscured by the top part of the automobile while the operator occupies normal posture, a resilient wire bracket having an upper loop portion, a rubber suction member held in said loop and adapted for suction engagement with the window, the top side of the lens having an integrally formed substantially key-stone-shaped projection with under-cut sides, the end portions of the wire being converged toward each other and having spring engagement with said under-cut sides, the intermediate portions of the wire between the loop and end portions extending towards each other so as to engage across the corners of the larger end of the key-stone projection, said parts being so constructed and arranged that the window-engaging surface of the suction member and the corresponding surface of the lens lie in substantially the same plane, and the said corresponding surface of the lens being entirely free of attaching means, whereby the lens may occupy position in close proximity to the window and without interfering with the normal flexure or expansion or contraction of the glass of the window.

19. In a device of the class described, the combination of a wire bracket having an intermediate loop portion and free end portions, said loop portion having an opening therein, and a suction cup having a neck portion and an enlarged top portion adapted to be threaded through said opening so as to become fully engaged in said loop portion, and a lens having means of attachment to said free end portions.

20. In a device of the class described, the combination of a wire bracket having an intermediate loop portion and diverging free end portions, said loop portion being open at the free end portions, and a suction cup having a neck portion and an enlarged top portion adapted to be threaded through said opening so as to become fully engaged in said loop portion, and a lens having means of attachment to said free end portions.

In testimony whereof, I hereby affix my signature.

BRUCE W. DAVID.